United States Patent Office 3,700,602
Patented Oct. 24, 1972

---

3,700,602
METHOD FOR MASS TAGGING SAND WITH A RADIOACTIVE ISOTOPE
Elick H. Acree and Forrest Neil Case, Oak Ridge, Tenn., and Nancy H. Stephens, Laurinburg, N.C., assignors to the United States of America as represented by the United States Atomic Energy Commission
No Drawing. Filed Sept. 4, 1969, Ser. No. 855,390
Int. Cl. G21h 5/02
U.S. Cl. 252—301.1 R                     3 Claims

ABSTRACT OF THE DISCLOSURE

A procedure for tagging sand with $^{198}$Au for use in the study of sediment transport involves precipitation of $^{198}$Au directly onto the sand particles from an appropriate aqueous solution containing the radioisotope by means of a reaction with immiscible organic reducing agent such as p-isopropylbenzaldehyde. This process provides a radioisotope labeling technique in which the number of radiations detected per unit weight of sand is approximately proportional to the mass rather than being proportional to the surface area.

---

The present invention relates generally to the marking of sand for oceanographic studies, and more particularly to the tagging of sand with a radioisotope without deleteriously altering the natural hydraulic properties of the sand whereby the movement of the sand may be readily monitored when subjected to natural hydraulic forces. This invention was made in the course of, or under, a contract with the United States Atomic Energy Commission.

An aspect of oceanography which is of considerable interest is in the study of sand movement along shore lines bounding oceans and other large bodies of water for the purpose of aiding in the planning of harbors and other coastal constructions and also for the protection and restoration of beaches. Sand is a somewhat hydraulic material and is moved along the shore line by the action of waves breaking against the shore. As the waves break, part of their dissipated energy moves in a direction parallel to the shore line to provide what is commonly referred to as the "littoral current." The sand movement due to the forces of this littoral current effect is referred to as "littoral drift."

The tracing and monitoring of the sand subjected to the above-noted currents and other hydraulic action involves the technique of marking the sand in such a manner that the position of discrete sand grains may be detected at any time by using a suitable monitoring system. The tagging or marking of sand with detectable indicia or signal emitting mechanisms has been accomplished by practicing previously known techniques which offer some degree of satisfaction in the area of tracing sand movement. However, the techniques previously utilized for marking the sand have not been entirely satisfactory in that some shortcomings or drawbacks are present in the marked sand. For example, one of the techniques previously employed for tagging sand involved the application of a resinous or siliceous material containing fluorescent dyes of radioisotopes. The use of these materials provided the individual sand grains with a coating which deleteriously interfered with and altered the natural hydraulic properties of the sand so as to cause the treated sand to behave somewhat differently from the untreated sand. Another of the previously known techniques for tagging sand has been to irradiate batches of sand in a nuclear reactor to induce radioactivity into the impurities contained in the sand, e.g., $^{59}$Fe by the neutron irradiation of $^{58}$Fe. Sand tagged by this method is somewhat expensive to prepare and the induced activity is severely limited by the quantity and type of impurities naturally present in the sand. Tagging sand with a radioisotope has also been accomplished by the direct reduction of $^{198}$Au with stannous chloride or by the reduction of a silver compound, e.g., silver nitrate, followed by substitution of $^{198}$Au for the silver. The use of such water-miscible reducing agents or reactants causes the precipitation of the radioisotope onto the sand to take effect while the isotope is in solution. This procedure has a shortcoming due to the fact that the radioisotope is not adequately fixed in the sand particles and can be abraded off in relatively short periods when the sand is being employed in a sand movement study.

Of the previously known sand tagging methods one has been found to be somewhat satisfactory for effecting mass tagging with a radioisotope. This tagging method comprises heating sand indigenous to a test area to a temperature in the range of 860° to 1100° C. in an environment containing a gaseous radioisotope selected from the group of $^{133}$Xe, $^{85}$Kr, and $^{37}$Ar. The gaseous radioisotope is sorbed onto the sand particles and is retained in such a manner that the activity remains within the sand for a duration sufficient to trace sand movement in the littoral transport area. Also, the quantity of radioisotope sorbed by individual sand particles is proportional to the mass of each particle. However, this method of tagging sand has a drawback in that the energy emitted by any of these radioisotopes is relatively low so as to inhibit the detection of the tagged particles when buried to a depth greater than about four inches.

An object of the present invention is to provide a new and improved method for mass labeling or tagging sand to facilitate the detection and the monitoring of the movement thereof when such sand is subjected to natural hydraulic forces such as those common to coastal areas.

Another object of the present invention is to provide a method for tagging sand with a radioisotope whereby the natural hydraulic properties of the sand remain virtually unaltered and the position of sand particles can be monitored even when buried to depths as great as eight inches.

A further object of the present invention is to provide a method of labeling sand whereby losses of radioactivity due to leaching and attrition are negligible during the period of time during which the sand movement is being monitored.

These and other objectives of the present invention are achieved by impregnating sand particles with a water-immiscible organic reducing agent, drying the impregnated sand, and then contacting the latter with an aqueous solution containing the radioactive tagging material. With the water-immiscible reducing agent surrounding the sand particle the reaction occurs on the particle surface when contacted by the aqueous solution containing the radioactive isotope. This reaction on the surface of the sand particle is a chemical reaction which is completed in about 3 to 10 minutes and causes the radioisotope to be tenaciously bound or secured onto the particle.

The water-immiscible organic reducing agent is preferably p-isopropylbenzaldehyde, but other reducing agents such as valeraldehyde and caproaldehyde may be employed. In order to insure adequate distribution of the reducing agent over the entire exposed surface portions of the sand particle the reducing agent is preferably highly diluted so as to have a viscosity approaching that of water. Suitable diluents include alcohols and ethers.

The radioisotope employed for the labeling or tagging is preferably gold-198 because of its half-life and radiant energy spectrum. However, other radioisotopes which may be chemically reduced in the manner as described herein and are useful for sand tagging studies include silver-110, iridum-192, and platinum-195. While the radioisotopes are preferably contained in an aqueous halide solution, aqueous nitrate, cyanide, or sulfate solutions function satisfactorily.

The sand to be tagged with the radioisotope is preferably subjected to a thorough cleaning operation to remove carbonate fragments normally present in beach areas since such fragments may cause precipitates of the reactants and also cause some outgassing during a heating operation, as will be described in detail below. Satisfactory cleaning results may be achieved by using a dilute solution of HCl or any other suitable acidic solution.

In order to more clearly demonstrate the method of the present invention, an example illustrative of a typical sand tagging operation is set forth below.

EXAMPLE

A 30-gram sand sample was thoroughly cleansed with a dilute HCl solution, rinsed, dried, and then treated with 3 milliliters of isopropylbenzaldehyde dissolved in 15 milliliters of absolute ethanol. After allowing the mixture to stand for approximately 15 minutes, the liquid is decanted and the sand particles are then washed and dried. Upon completing the drying step the sand is placed in an aqueous halide solution of $^{198}$Au chloride. The aqueous solution reacts with the organic reducing agent in the sand to bind the $^{198}$Au onto the sand particle. After a reaction time of 10 minutes the solution is decanted and the particles are ready for use. This technique of labeling is approximately 55 percent efficient with approximately 92 percent of the gold being removed from the aqueous solution and with about 65 percent of this gold remaining on the sand after leaching the sand in water for about 10 minutes. A repeat of this leach removes about 5 more percent of the radioisotope from the sand.

It has been found by heating the sand after completing the above-described reaction that the percentage of the radioisotope retained by the sand particles is substantially increased; e.g., with sand treated as above described when heated to a temperature of 500° C., the retention of $^{198}$Au in the sand is increased to about 70 percent and remains at this level even after two leaching operations. This greater radioisotope retention increases the efficiency of the sand tagging process to about 64 percent. Heating the sand to about 1000° C. increases the process efficiency to about 90 percent with approximately 98 percent of the $^{198}$Au remaining on the sand after the first leach. Further, virtually no $^{198}$Au is lost when the sand is subjected to additional leachings. Thus, with this last-mentioned procedure the over-all retention of the radioisotope by the sand is 98 percent. The heating of the sand to the temperature range of about 500° C. to about 1000° C. to effect the aforementioned radioisotope retention is preferably maintained for a duration of about 5 to 10 minutes. Higher temperatures or longer soak times may be utilized in this step of increasing the radioisotope retention, but the latter is enhanced very little by employing temperatures higher than about 1000° C. and longer soak times. Further, care should be exercised if such higher temperatures are employed to prevent fusing or other conditions which may alter the natural hydraulic properties of the sand.

As described above, the subject method is utilized for mass tagging sand with a radioisotope in a tenaciously adherent manner without deleteriously altering the natural hydraulic property of the sand. This feature is highly desirable for the purposes of monitoring the sand movement in that the treated sand must follow the natural hydraulic movement common to the untreated sand for providing accurate data relating to sand movement. Inasmuch as sand taken from one environment and placed in another behaves differently, the sand subjected to the tagging method of the present invention should be indigenous to the area where the sand movement is to be studied. Accordingly, selected batches of sand from the area to be investigated are subjected to radioisotope tagging and thereafter mingled with the untreated sand in the same area for the purpose of monitoring the natural movement of the admixed sand mass.

What is claimed is:

1. A method of labeling sand with a radioisotope for facilitating the detection and movement of sand when subjected to hydraulic movement, comprising the steps of impregnating at least one sand particle with a water-immiscible solution consisting essentially of an organic reducing agent selected from the group consisting of p-isopropylbenzaldehyde, valeraldehyde, and caproaldehyde, and a diluent for the reducing agent selected from the group consisting of alcohol and ethers, drying the impregnated sand particle, and contacting the impregnated sand particle with an aqueous solution of a chemically reducible compound selected from the group consisting of halide, nitrate, cyanide, and sulphate salts of a radioisotope to chemically reduce the compound and effect the deposition of the radioisotope onto exposed surface portions of the sand particle.

2. A method of labeling sand with a radioisotope as claimed in claim 1, wherein the radioisotope is selected from the group consisting of gold-198, silver-110, iridium-192, and platinum-195.

3. A method of labeling sand with a radioisotope as claimed in claim 2, including the step of heating the sand particle subsequent to the binding of the radioisotope thereon to a temperature in the range of about 500° C. to about 1000° C. to effect the retention of substantially all of the radioisotope on the sand particle and maintaining the sand particle at said temperature for a duration of about 5 to 10 minutes.

References Cited

UNITED STATES PATENTS

| | | | |
|---|---|---|---|
| 2,462,241 | 2/1949 | Wallhausen et al. | 252—301.1 |
| 2,955,088 | 10/1960 | Beerbower et al. | 252—301.1 |
| 3,147,225 | 9/1964 | Ryan | 252—301.1 |
| 3,149,233 | 9/1964 | Wilson et al. | 250—106 T |
| 3,364,148 | 1/1968 | Kivel et al. | 252—301.1 |
| 3,426,205 | 2/1969 | Acree et al. | 250—106 T |

FOREIGN PATENTS

| | | | |
|---|---|---|---|
| 1,043,415 | 9/1966 | Great Britain | 252—301.1 |

OTHER REFERENCES

Bougault et al.: Surface Deposition of Radioisotopes on Sand and Silts, Nuclear Science Abstracts, vol. 22, No. 10, May 1968, Abs. No. 19063.

Giresse et al.: An Application of the Radioactive Tracer Method: A Study of Displacements of Sediment in the Course and at the Mouth of the Seine, Nuclear Science Abstracts, vol. 22, No. 23, December 1968, Abs. No. 48942.

CARL D. QUARFORTH, Primary Examiner

F. M. GITTES, Assistant Examiner

U.S. Cl. X.R.

250—106 T